3,646,092
PROCESS FOR THE RECOVERY OF TRIMETHYL-FLUOROSILANE FROM A MIXTURE OF SILICON-TETRACHLORIDE, TRIMETHYLCHLOROSILANE AND HYDROCARBONS BOILING AT THE SAME RANGE

Christian Dathe, Radebeul, Germany, assignor to Institut fur Silikon- und Fluorkarbon-Chemie, Radebeul, Germany
No Drawing. Filed May 20, 1969, Ser. No. 826,265
Int. Cl. C07f 7/04, 7/18
U.S. Cl. 260—448.2 E   6 Claims

ABSTRACT OF THE DISCLOSURE

A process for the recovery of trimethylfluorosilane from a mixture of silicontetrachloride, trimethylchlorosilane and hydrocarbons boiling in the same range, which comprises reacting said mixture with a difficultly soluble metal fluoride of the first to third main groups of the Periodic System of Elements at about normal temperature in the presence of a solvent including water and organic solvents, and collecting the trimethylfluorosilane escaping from the reaction mixture by condensation. The trimethylfluorosilane can be used e.g. for making hexamethyldisiloxane which is an important material in the production of silicone oils.

---

Mixtures of silicontetrachloride of the boiling point 57.6° C. and trimethylchlorosilane, B.P. 57.3° C., as they are obtained in the synthesis of methylchlorosilanes, are difficult to separate by distillation due to the close vicinity of their boiling points and to the formation of an azeotropic mixture of the two compounds boiling at 54.5° C.; if separation is achieved at all, it is quite unsatisfactory.

A large number of methods has been described for obtaining the valuable compound trimethylchlorosilane, some of which are advantageous in that the chlorosilanes are converted into the corresponding fluorosilanes which are easy to separate from each other. One proposal, which consists of using hydrofluoric acid as fluorinating agent (described in German Pat. 1,142,364), has the particular advantage that $SiF_4$ formed during the reaction remains dissolved as siliconhydrofluoric acid whereas trimethylfluorosilane (B.P. 16.4° C.) escapes in pure state as a gas.

However it is a disadvantage of the process that reaction vessels have to be used which are resistant to hydrofluoric acid and that special protective measures are required because of the harmful effects of the acid on the operating personnel; these make the process rather cumbersome.

It was further proposed to use, instead of hydrofluoric acid, its less harmful, water-soluble salts, such as $SbF_3$, $NH_4F$; however the yields are then lower and the operating costs higher because of the higher price of the fluorinating agents.

It is an object of the invention to provide a process which permits to avoid the above-mentioned drawbacks of the known methods.

It is another object to provide a process which uses cheaper and less dangerous fluorinating agents, while achieving the same favorable results and avoiding undesirable side effects.

Other objects and advantages will become apparent from the following detailed description.

It has been found quite unexpectedly that the difficultly soluble metal fluorides of the first to third main groups of the Periodic System, more particularly calcium fluoride, cause a quantitative separation of the components of the mixture, as does hydrofluoric acid, when $CaF_2$ is activated by hydrochloric acid before fluorination takes place. For the process according to the invention it makes no difference whether HCl is added to the fluorination mixture from the start or whether it is formed in situ by the reaction of the chlorosilanes with water, alcohol or the like present in the mixture.

In a preferred embodiment, a mixture of silicontetrachloride and trimethylchlorosilane is dropwise added while stirring into a solution of a solvent, e.g. ethanol, and calcium fluoride or one of the other difficultly soluble fluorides, and allowed to react for a period ranging from 10 minutes to 5 hours. The reaction starts already while the mixture is added dropwise and proceeds during the time indicated above. Since the desired end products have a much lower boiling point than the starting materials, they are escaping continuously and collected under condensation, for instance in cooling traps arranged in series, where the temperature is maintained at 0 to −80° C. A first batch of trimethylfluorosilane is collected in the trap. The remaining reaction mixture is then heated in a water bath to a temperature between 70 and 90° C., and a second batch of trimethylfluorosilane is thereby obtained so that the total yield is on the average from 90 to 95% by weight of pure trimethylfluorosilane.

Calcium fluoride may be used in the commercial, technical grade e.g. as ground fluorspar, or in the form of $CaF_2$ slurry, as obtained from the de-fluorination plants existing for the treatment of waste water containing hydrofluoric acid. It is advantageous but not absolutely necessary to use a slight excess of the fluorinating agent over the calculated amount in the following equations $$2(CH_3)_3SiCl + CaF_2 \rightarrow 2(CH_3)_3SiF + CaCl_2 \quad (1)$$
$$SiCl_4 + 3CaF_2 \rightarrow CaSiF_6 + 2CaCl_2 \quad (2)$$

As alcohols, any technically available alkylalcohols may be used, preferably ethanol, propanol and butanol. They may be used pure or mixed with water. Water often facilitates the reaction and may increase the yields. The amount of water compatible with the alcohol is not limited; preferably we use 10 to 100% by weight of water calculated on the alcohol.

Instead of alcohol, other organic solvents may be used, e.g. toluene, together with water. The solvents most suited are those miscible with water, e.g. ketones, such as acetone, acetonitrile, dioxane and tetrahydrofurane.

It goes without saying that the process may also be advantageously carried out when the chlorosilane mixture contains hydrocarbons as impurities—which is always the case in technical mixtures; such impurities are e.g. 2-methylpentane (B.P. 60.3° C.) or 3-methylpentane (B.P. 63.2° C.) which likewise form azeotropic mixtures with trimethylchlorosilane, having boiling points at 56.4° C. and 57.3° C., respectively.

It has already been proposed to use the difficultly soluble metal fluorides of the first and third main groups of the Periodic System, particularly $CaF_2$, as fluorinating agents for organochlorosilanes. It was however not to be foreseen that silicontetrachloride present in mixture with trimethylchlorosilane would be quantitatively retained by the fluorinating mixture. It was to be expected that, in the presence of water, hydrolysis would occur with subsequent co-condensation of the two chlorosilanes leading to oily organopolysilanes difficult to split, a fact which would render the yield in trimethylfluorosilane much lower. However, unexpectedly, such difficulties did not occur.

The process according to the invention is not limited to the use of calcium fluoride though the latter has the advantages of plentiful native occurrence and low price. With equal success we may use according to the invention all fluorides of metals of the main Groups I to III of the Periodic System, which are difficulty soluble in water and non-reacting in dry state.

For instance, sodium fluoride in alcoholic suspension completely separates mixtures of silicontetrachloride and trimethylchlorosilane whereas it does not react with chlorosilanes in dry state and forms with trimethylchlorosilane alone in water only about 60% by weight of trimethylfluorosilane. Lithium-, magnesium- and barium fluorides, which likewise do not react in water with chlorosilanes alone to any substantial amount, due to their low solubility, are capable of separating the components as described above if the process according to the invention is applied. Even with aluminum fluoride, trimethylchlorosilane may be separated quantitatively from a mixture of the chlorosilanes, with simultaneous formation of aluminum chloride. This is all the more astonishing since according to previously published literature organofluorosilanes are re-converted to organochlorosilanes, the reaction thus occurring in opposite direction (see Z. anorg. allg. Chem., 313, 208 [1961]).

The process according to the invention has considerable advantages when compared to hydrofluoric acid as separating agent. $CaF_2$ is cheaper than HF since the latter is obtained from the former. The reaction may be carried out in conventional vessels e.g. made of glass, china, enamel and so forth, which need not be resistant to HF. Whereas with more than 60% by weight of $SiCl_4$ in the mixture the separation with HF is made very difficult, the reaction being highly exothermic thus incurring increased corrosion, and high energy input for heat dissipation, in the inventive process such difficulties do not present themselves since no heat has to be dissipated and HF is not directly liberated. The safety measures to be observed in the use of HF can therefore be reduced to a large extent.

It is another advantage of the instant process that the waste materials formed are much easier to eliminate than when the usual fluorinating agents are employed, including HF. Thus waste waters need not be de-fluorinated when acording to the invention difficultly soluble metal fluorides are used. Solvents can be readily regenerated by distillation, and so on. If, for instance, aqueous butanol is used, this separates easily from supernatant aqueous calcium- or other metal chloride solution. It only has to be decanted and can be used again without distillation. An excess of $CaF_2$, which remained unreacted, can be reused without purification, so that contrary to HF and other fluorinating agents, $CaF_2$ is utilized quantitatively in the process. The same is true for the other metal fluorides used, which though being more expensive than $CaF_2$, are frequently obtained as by-products in other chemical reactions and find an economical use in the process of this invention.

The trimethylfluorosilane obtained according to the invention may be collected or immediately saponified in accordance with known processes to hexamethyldisiloxane, which is an important material in the production of silicone oils.

An example of the preparation of hexamethyldisiloxane is given in the following. 92 g. (one mol) trimethylfluorosilane are passed for saponification through a safety flask into two rinsing flasks, the first of which contains 548 ml. of 2 N NaOH, the second 100 ml. 2 N NaOH. Both flasks are cooled with ice water. After the entire amount of the fluorosilane has been saponified, neutralization is carried out with 5 N $H.SO_4$ and a small excess amount of acid is added. Then the upper layer amounting to 66 g. is separated. Hexamethyldisiloxane is thereby obtained, having a refraction index of $n_D^{20} = 1.3779$ (theoretical 1.3774). The aqueous layer was then twice extracted with ether and the ether driven off, which left another 8.5 g. of hexamethyldisiloxane, increasingly the total yield to 92% calculated on trimethylfluorosilane used.

The invention will now be more fully explained in a number of examples but it should be understood that these are given by way of illustration and not of limitation and that many changes in the details can be made without departing from the spirit of the invention.

It should be noted that all percentages indicated in the examples are to be understood by weight.

EXAMPLE 1

50 g. ethanol, 50 ml. water and 27 g. ground fluorspar are first introduced at room temperature into a glass flask equipped with stirrer, dropping funnel and reflux cooler, and then there is added drop by drop, while stirring, a mixture of 11 g. trimethylchlorosilane and 17 g. silicontetrachloride in the molar ratio 1:1. Connected to the glass flask is a trap cooled to −78° C. in which 3.5 g. trimethylfluorosilane are condensed. The condensate is subsequently heated in a water bath which is maintained at a temperature of 70 to 90° C., and with the use of the reflux cooler, having a temperature adjustment of 16 to 40° C., whereby the yield is increased to 8.5 g. (92%) of boiling point 16° C. (literature: 16.4° C.). The purity of the product is 96.8%, with 2.8% $C_2H_5Cl$ as impurity.

EXAMPLE 2

In a manner similar to Example 1, a mixture of 11 g. trimethylchlorosilane and 17 g. silicontetrachloride was added drop by drop to a stirred suspension of 50 g.

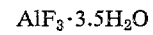

100 ml. ethanol and 25 ml. water. From the condensate collected after heating in the water bath, amounting to 10.5 g., distillation yielded 9.5 g. trimethylfluorosilane contaminated with 9% ethylchloride.

EXAMPLE 3

In a similar manner as described in the foregoing examples, a mixture of 11 g. trimethylchlorosilane and 17 g. silicontetrachloride was added drop by drop to 100 ml. ethanol and 42 g. sodium fluoride while stirring. 4 g. (44%) solid trimethylfluorosilane were collected in the trap cooled to −78° C. Subsequently, 25 ml. water were added to the reaction mixture. When heated to 80° C. in the water bath with reflux adjustment as in Example 1, the yield increased to 9 g. (98%) trimethylfluorosilane which boiled constantly at 16° C. with 1 g. remaining as a residue. Yield of pure product: 87%.

EXAMPLE 4

A mixture of 11 g. trimethylchlorosilane and 17 g. silicontetrachloride was added drop by drop into a stirred suspension of 40 g. ground fluorspar and 100 ml. of 96% ethanol, whereby 2 g. condensate was collected; after heating in the water bath to 70° C., the condensate rose to 12 g., containing 73.6 g. trimethylfluorosilane (96% of the theoretical amount) and 25.6% ethylchloride.

When the test was carried out with 100 ml. water instead of ethanol, the yield in trimethylfluorosilane was only 2 g. (22% of the theoretical).

EXAMPLE 5

A mixture of 11 g. trimethylchlorosilane and 17 g. silicontetrachloride was added drop by drop to a stirred suspension of 100 ml. acetone, 20 ml. water and 26 g. lithium fluoride; upon heating in the water bath a condensate of 14 g. could be collected, which when distilled gave 9 g. (98%) trimethylfluorosilane (boiling point 16° C., purity 99.99%).

EXAMPLE 6

11 g. trimethylchlorosilane and 17 g. silicontetrachloride were added dropwise together to a stirred suspension of 32 g. magnesium fluoride, 135 ml. n-butanol and 25 ml. water. Upon heating 9 g. (98%) trimethylfluorosilane condensed, purity 100%.

EXAMPLE 7

11 g. trimethylchlorosilane and 17 g. silicontetrachloride were added dropwise together to a stirred suspension of 88 g. barium flouride, 135 ml. n-propanol and 25 ml.

water. From the condensate collected upon heating, amounting to 9.5 g., we obtained 8.5 g. (92%) trimethylfluorosilane by distillation, having a boiling point of 16° C. and a purity of 100%.

EXAMPLE 8

11 g. trimethylchlorosilane and 17 g. silicontetrachloride were added dropwise together to a stirred suspension of 40 g. fluorospar, 100 ml. tetrahydrofurane and 50 ml. water. From the condensate collected upon heating, amounting to 10 g. we obtained 8 g. (87%) trimethylfluorosilane by distillation, having a boiling point of 16° C.

EXAMPLE 9

11 g. trimethylchlorosilane and 17 g. silicontetrachloride were added dropwise together to a stirred suspension of 40 g. fluorspar, 100 ml. dioxane and 50 ml. water. From the condensate collected upon heating, amounting to 11 g., we obtained 9 g. (98%) pure trimethylfluorosilane by distillation, having a boiling point of 16° C.

EXAMPLE 10

11 g. trimethylchlorosilane and 17 g. silicontetrachloride were added dropwise together to a stirred suspension of 40 g. fluorspar, 100 g. toluene, 25 ml. n-butanol and 50 ml. water. From the condensate collected upon heating, amounting to 11 g., we obtained 9 g. (98%) pure trimethylfluorosilane by distillation, having a boiling point of 16° C. and a purity of 100%.

EXAMPLE 11

11 g. trimethylchlorosilane and 17 g. silicontetrachloride were added dropwise together to a stirred suspension of 40 g. fluorspar, 100 ml. toluene and 50 ml. water. From the condensate collected upon heating, amounting to 10 g., we obtained 9 g. (98%) pure trimethyfluorosilane by distillation, having a boiling point of 16° C.

EXAMPLE 12

A technical grade mixture consisting of 53.4% trimethylchlorosilane, 36.2% silicontetrachloride (molar ratio $(CH_3)_3SiCl:SiCl_4=7:3$) and 10.3% hydrocarbons consisting mainly of 2-methylpentane and 3-methylpentane, a mixture as obtained in the distillation of methylchlorosilanes in the Mueller-Rochow synthesis, were added drop by drop into a suspension of 40 g. fluorospar, 135 ml. n-butanol and 25 ml. water. Upon heating, a condensate was formed containing 14 g. trimethylfluorosilane, of which 11 g. (81%) of the pure compound having a boiling point of 16° C. were obtained by distillation.

EXAMPLE 13

A mixture of 6.5 g. trimethylchlorosilane and 24 g. silicontetrachloride (molar ratio 3:7) was added drop by drop into a stirred suspension of 40 g. fluorspar, 135 ml. n-butanol and 25 ml. water. From the condensate collected upon heating, amounting to 8 g., we obtained by distillation 5.2 g. (95%) trimethylfluorosilane, 98% pure, having a boiling point of 16° C.

It should be understood, of course, that the foregoing disclosure relates only to preferred embodiments of the invention and that it is intended to cover all changes and modifications of the examples described which do not consitute departures from the spirit and scope of the invention as set forth in the appended claims.

It may be added that this application is closely related to the same inventor's co-pending application, filed concurrently herewith, and entitled "Process for Preparing Fluorine Compounds from Organosilicon Compounds by Means of Fluorides of the First to Third Main Groups of the Periodic System," Ser. No. 826,259.

What I claim is:

1. A process for the recovery of trimethylfluorosilane from a mixture of silicontetrachloride, trimethylchlorosilane and hydrocarbons boiling in the same range, which comprises the steps of reacting said mixture with at least a stoichiometric amount of a metal fluoride of the first to third main groups of the Periodic System of Elements, said fluoride being difficultly soluble in water and mixtures of water with mineral acids, at about normal temperature in the presence of a solvent including water and organic solvents, and collecting the trimethylfluorosilane escaping from the reaction mixture by condensation.

2. The process as defined in claim 1, wherein the condensation is effected in a temperature range of 0 to −80° C.

3. The process as defined in claim 1, wherein the reaction mixture is heated to temperatures between 70 and 90° C. under reflux cooling adjusted to 16 to 40° C. before collecting the trimethylfluorosilane formed in the reaction, whereby a substantial increase in the yield of trimethylfluorosilane is obtained.

4. The process as defined in claim 1, wherein the pure trimethylfluorosilane is obtained from the collected product by distillation.

5. The process as defined in claim 1, wherein the metal fluoride used is calcium fluoride activated by HCl.

6. The process as defined in claim 1, wherein the solvent is an alcohol selected from the group consisting of ethanol, propanol and butanol.

References Cited

Eaborn, "Organosilicon Compounds," Academic Press Inc., N.Y. (1960), pp. 174–175.

JAMES E. POER, Primary Examiner

P. F. SHAVER, Assistant Examiner

U.S. Cl. X.R.

260—448.8 R